United States Patent [19]
Benenti et al.

[11] Patent Number: 6,115,381
[45] Date of Patent: Sep. 5, 2000

[54] INTERFACING DEVICE FOR ATM NETWORKS

[75] Inventors: Claudio Benenti, La Loggia; Alessandro Cama, Sarre; Antonio Cavallaro, Mathi; Paolo Destefanis, Turin; Andrea Scoscina, Teramo, all of Italy

[73] Assignee: Telecom Italia S.P.A., Turin, Italy

[21] Appl. No.: 08/977,099

[22] Filed: Nov. 24, 1997

[30] Foreign Application Priority Data

Dec. 30, 1996 [IT] Italy ................................. TO96A1096

[51] Int. Cl.$^7$ ................................................. H04L 12/56
[52] U.S. Cl. .............................................. 370/395; 370/419
[58] Field of Search ................................. 370/356, 359, 370/360, 363, 366, 389, 392, 394, 395, 400, 412, 419

[56] References Cited

U.S. PATENT DOCUMENTS

| | | | |
|---|---|---|---|
| 5,742,765 | 4/1998 | Wong et al. | 395/200.6 |
| 5,844,887 | 12/1999 | Oren et al. | 370/218 |
| 5,850,395 | 12/1998 | Hauser et al. | 370/398 |
| 5,852,606 | 12/1998 | Prince et al. | 370/393 |
| 5,953,338 | 9/1999 | Ma et al. | 370/395 |
| 5,956,337 | 9/1999 | Gaddis | 370/395 |
| 5,959,996 | 9/1999 | Byers | 370/401 |

FOREIGN PATENT DOCUMENTS

| | | |
|---|---|---|
| 0 512 495 A2 | 11/1992 | European Pat. Off. . |
| 0 581 087 A1 | 2/1994 | European Pat. Off. . |
| 4-212544 | 8/1992 | Japan . |
| 5-37545 | 2/1993 | Japan . |
| 405160850 | 6/1993 | Japan ................... 370/395 |
| WO009808355A | 12/1998 | WIPO ............ H04Q 11/04 |

*Primary Examiner*—Hassan Kizou
*Assistant Examiner*—Ahmed Elallam
*Attorney, Agent, or Firm*—Herbert Dubno

[57] ABSTRACT

The device essentially consists of an adapter having a centralized unit (5) tasked with manipulating ATM flows and managing access requests, and specialized modules ($3_1 \ldots 3_k \ldots 3_n$) which allow direct access to the ATM network by, for instance, a satellite network or a service ($2_1 \ldots 2_k \ldots 2_n$). The centralized unit (5) dynamically allocates the available band on the ATM network access resources according to the access requests by the interface towards the outside world, by handling individual requests as separate connections.

7 Claims, 7 Drawing Sheets

INTERFACING DEVICE FOR ATM NETWORKS

FIELD OF THE INVENTION

The present invention relates to a device for interfacing an ATM (Asynchronous Transfer Mode) network with connection lines of the kind commonly known as "connection oriented", such as the lines used for AAL1 (ATM Adaptation Layer 1) services, with fixed bit rate.

BACKGROUND OF THE INVENTION

The term "connection oriented lines" indicates, as the people skilled in the art know, lines intended to convey signals pertaining to a specific application. The term "application" is used to indicate an apparatus, a service, a network. For additional clarification on AAL1 services, reference can be made to the standardization documents ITU-T I.362, I.363.

The present invention has been developed with particular attention to its possible use to interface an ATM network operating at 34 Mbit/s both with conventional telecommunications networks (terrestrial or via satellite), and with terminals offering broad band services (multimedia services).

Typical examples of the related connection lines are those based on the G.703 interface at 2 Mbit/s and on the RS449 interface with bit rate N·64 kbit/s.

As is well known, ATM transport techniques have the purpose of enhancing the efficiency of telecommunications networks in terms of flexibility, reconfiguration capability and transport capacity, according to criteria providing for the organization of the flows transported into so-called cells. Such cells are routed within the ATM network according to dynamic schemes able to attain an optimal adaptation of the network exploitation to the transport requirements.

In order to transport on an ATM network data flows conveyed over connection lines of the type mentioned previously, until now it has been suggested to create within the ATM network a durable connection (albeit constituted according to the typical operating modes of the ATM network) between the two nodes involved in the transport. This connection is maintained, with its pre-established, fixed band, throughout the time interval during which the information flow is transported. This also occurs when the band actually needed for transport is reduced, at least temporarily. In practice, a connection destined to transit over the network is always allocated 34 Mbit/s even when the transport requirements of the connection are in fact lower.

Taking into account that the essential advantage of an ATM network is indeed allowing the simultaneous, multipoint transport of multiple information flows with a continuous adaptation to the actual transmission needs, it is evident that the operating modes described above are scarcely efficient in respect of network utilization and, as a consequence, for the user himself, who has to take on the costs of the connection regardless of its actual full exploitation.

OBJECT OF THE INVENTION

The present invention has the purpose of providing an interface device capable of overcoming the drawbacks described above.

SUMMARY OF THE INVENTION

This object is attained in a device for interfacing an ATM network and a plurality of connection oriented lines which comprises:

a plurality of modules allowing direct access to the ATM network by at least one respective connection oriented line and arranged to accomplish, starting from a flow of digital data received on the connection oriented line, a segmentation of the data into ATM cells and, conversely, to reconstruct an outgoing data flow on at least one respective line starting from ATM cells, and a centralized unit which is connected to the modules of the plurality of modules is tasked with manipulating ATM flows and managing access requests by the connection oriented lines, and is arranged to multiplex ATM cells received from the modules into a flow of cells which can be managed by the ATM network and, respectively, of demultiplexing a flow of cells managed by the ATM network into ATM cells each routed towards a respective module of the plurality, the centralized unit dynamically assigning the access band available on the ATM network according to the access requests by the modules by handling individual requests as separate connections.

The modules of the plurality are connected to the centralized unit through a bus structure.

The access by the modules of the bus structure is governed with a priority mechanism that assigns the lowest priority to the module which has just obtained access to the bus structure and the highest priority to the module whose last access to the bus structure is the farthest in time.

The centralized unit is so dimensioned as to be capable of multiplexing ATM cells corresponding to a data flow equal to the sum of the flows of the connection lines into a single flow of ATM cells directed towards the ATM network.

The modules comprise, in the path from the connection lines towards the centralized unit, a circuit for the segmentation of the respective data flow and a circuit for the construction of a respective ATM cell starting from each segment formed by the segmentation circuit.

The modules comprise, in the path from said centralized unit towards the connection lines, a circuit for verifying the integrity of a frame into which ATM cell flows are organized and a circuit for the selective extraction from the frame of the data flow destined to the respective connection line. The circuit for frame integrity verification is arranged so as to insert into said frame stuffing cells in the bandwidth portion not used for transporting the related flow.

The centralized unit comprises, in the path from the modules towards the ATM network, a circuit for multiplexing the ATM cells received from respective modules, associated with a circuit for managing the transmission resources, and a circuit for mapping the multiplexed cells into a frame of ATM cells.

The centralized unit also comprises, in the path from the ATM network towards the modules a circuit for cell extraction from an ATM frame and a circuit for the selective routing of the extracted cells towards respective modules of the plurality.

The modules can comprise, on the side connected to the connection lines a physical interface towards the connection lines.

A control unit is provided for the control of the operation of said centralized unit and of the modules. The control unit can be configured in at least a master configuration, where the respective device is capable of controlling at least another analogous device connected to the ATM network, and at least a slave configuration, where the respective device is capable of being controlled by at least another analogous device connected to the ATM network.

At least some of the modules are selectively removable for replacement with other modules.

Means is provided for generating a request for allocating a first signalling virtual channel (MSCV) on the ATM network, which channel is shared with at least another homologous device connected to the ATM network itself, in view of the assignment, to the device generating the request, of a respective second signalling virtual channel (SVC) on the ATM network.

Such a device demonstrates, notably in its currently preferred embodiment, particularly appreciable functional features, especially in relation to the following aspects:

general modularity and configuration capability, in particular in regard to the interfaces on the application side, i.e. those facing the connection oriented lines;

adaptability of the centralized part to the different interfaces;

flexibility in the allocation of ATM resources with respect to the activation/deactivation of services on the application side, for instance by allowing the bit rate to be programmed at 64 kbit/s steps and/or by assigning each module (application) only the useful bandwidth structured in ATM cells; and general capability of constructing removable and replaceable interfaces.

BRIEF DESCRIPTION OF THE DRAWING

The above and other objects, features, and advantages will become more readily apparent from the following description, reference being made to the accompanying drawing in which:

FIGS. 6, 6a, 6b and 6c are diagrams which show the criteria for performing the signalling function in a device according to the invention.

SPECIFIC DESCRIPTION

Figure 1:
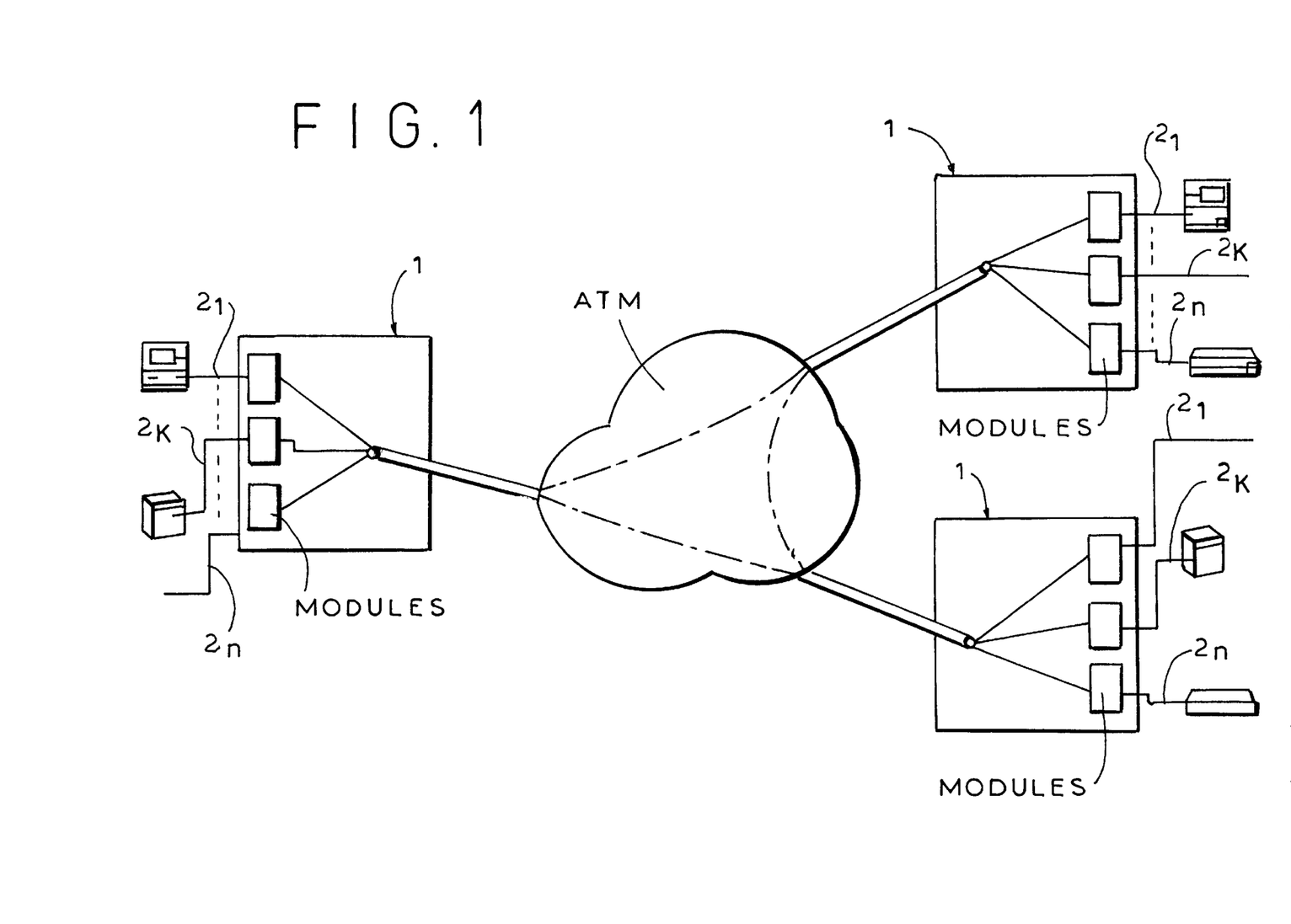
FIG. 1 is a system diagram which shows the typical scenario of use of a device according to the invention.

The diagram in FIG. 1 shows a plurality of devices according to the invention, each indicated with the reference numeral 1, connected to an ATM network (whose characteristics shall be considered to be wholly known in the description which follows) in order to allow their interfacing with a plurality of connection lines $2_1 \ldots 2_k \ldots 2_n$ (where n need not be the same for all the devices 1).

The diagram in FIG. 1 shows that the connection lines $2_k$ (k=1, ... n) are essentially arranged to transport "connection oriented" services, i.e. each line (or group of lines, which is equivalent) allows interfacing the device with a particular type of application (for instance: video encoder, audio encoder, satellite connection, etc.).

Figure 2:
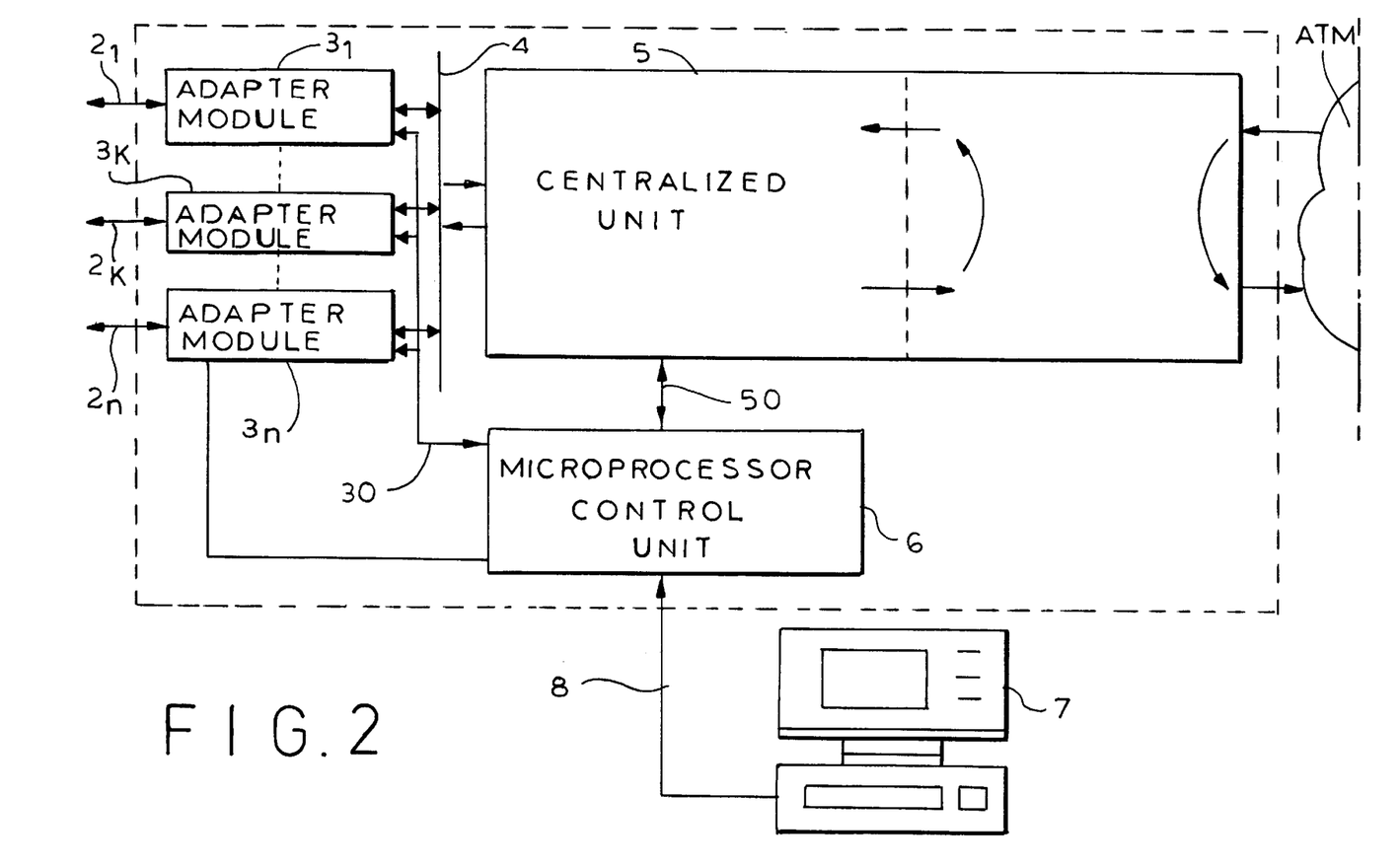
FIG. 2 is a block diagram of the overall architecture of the device according to the invention.

An important characteristic of the device according to the invention is that of being organized in two sections or stages, namely, with reference to the diagram in FIG. 2, a plurality of adapter modules $3_1 \ldots 3_k \ldots 3_n$ all connected, through a bus structure, indicated in its entirety as 4, to a centralized unit 5 which accomplishes the bi-directional connection of the modules with the ATM network. Both the adapter modules $3_k$ (k=1 ... n) and the centralised unit 5 act under the supervision of a control unit 6, for example a microprocessor unit, connected to a supervisory element such as a personal computer 7. The connections 30 and 50 represent the control and dialogue lines connecting the modules $3_k$ and the unit 5, respectively, with the control unit 6.

Preferably, the control unit 6 is based on a microprocessor architecture (for instance INTEL 80186), and it is capable of intervening on all circuits comprised in the device 1 and also of performing their initial configuration, their dynamic configuration and the diagnostics by communicating with the supervisory element 7.

The connection between the microprocessor control unit 6 and the supervisory element 7 is accomplished e.g. according to a conventional RS232 serial interface represented by connection 8.

The dialogue between the control unit 6 and the supervisory element 7 can generally take place directly, as described above, or by establishing a connection through the ATM network: in this case one of the devices 1 (to which the computer 7 is connected with the task of supervising the entire network made up by the devices 1) serves as master unit for all other devices 1, configured as slaves. To allow this latter operating mode, the unit 6 is therefore configurable either as a master unit, able to control, through the ATM network, the homologous units of one or more devices 1 connected to the same network or, vice versa, as a slave unit, destined to be controlled by the unit 6, in turn configured as master, of another device 1 connected to the ATM network.

In essential terms, the unit 5 performs all centralised interface functions towards the ATM network, and the processing of the related flows.

The other section of the device 1, made up of the adapter modules $3_1 \ldots 3_k \ldots 3_n$, performs all functions concerning adaptation to the applications, and the related interfaces towards the same applications. This section can be configured according to the application requirements through an appropriate choice or configuration of the related adapters, which can be constructed as removable and replaceable modules. The configuration change in the section 1 can thus be easily performed by inserting/replacing the various modules destined to that purpose, with the additional capability to allow the detection of each configuration variation in real time by the control microprocessor unit 6 and by the supervisory element 7, which perform the function of managing the apparatus.

Figure 3:
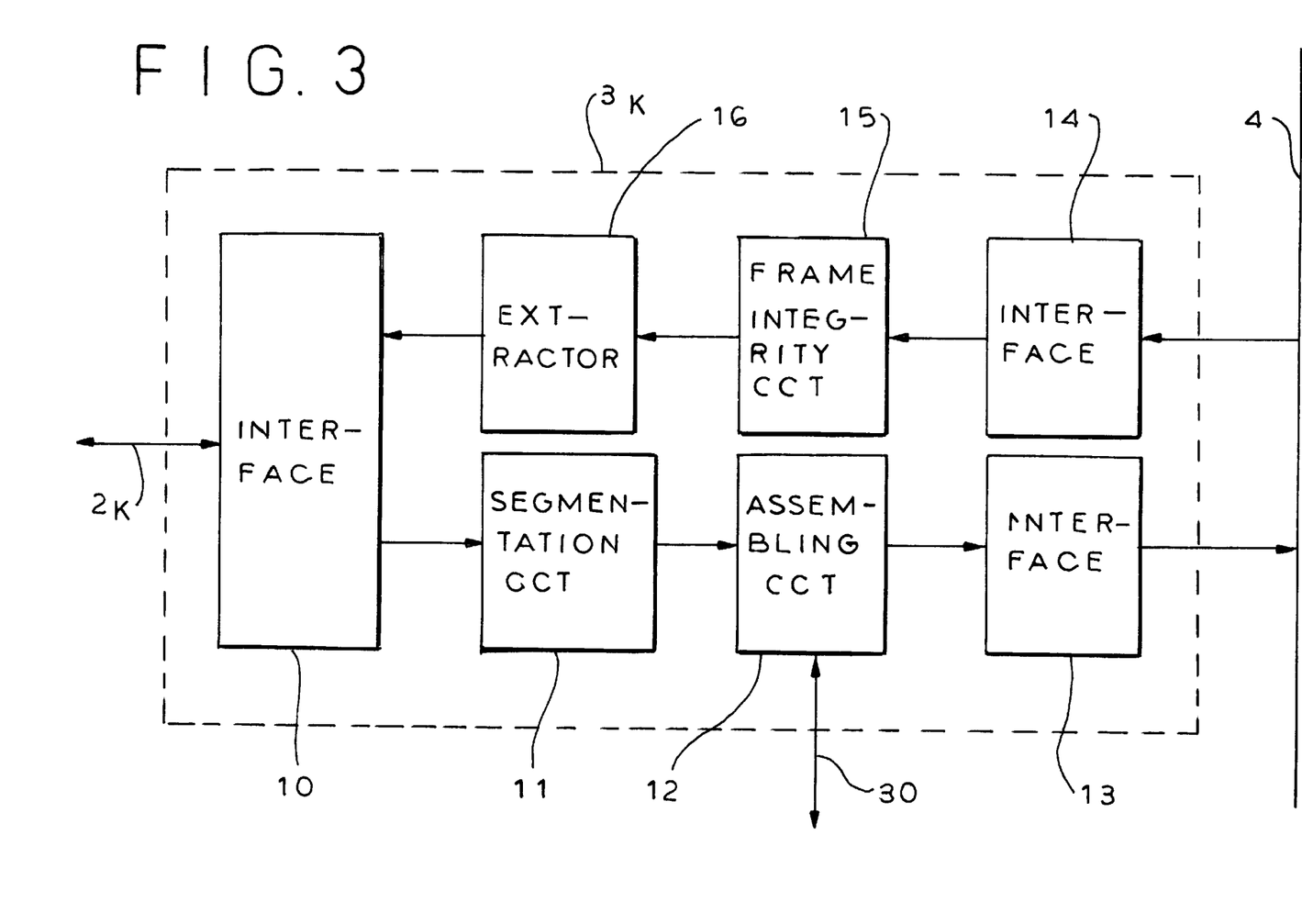
FIGS. 3 and 4 are two additional functional block diagrams showing the structure of two parts comprised in a device according to the invention.

The block diagram in FIG. 3 shows in detail the functional structure of one of the adapter modules, indicated as $3_k$ (k=1 ... n).

The module is interposed between the respective connection line $2_k$ (for example a line with a G.704 flow at 2.048 Mbit/s or N19 64 kbit/s, with RS449 interface) and the bus structure 4 providing connection to the centralised unit 5.

The adaptation is accomplished mainly, in one direction, by segmenting the flow received by module $3_k$ into ATM cells, destined to be sent towards the unit 5 and, in the opposite direction, by reconstructing the original data structure, to be sent over the line $2_k$, starting from the ATM cells received from the unit 5.

In essential terms, in the module $3_k$, it is possible to recognize first of all a circuit 10 embodying the physical interface (adaptation of the voltage levels, of the impedance levels, etc.) with the connection line (application) $2_k$: the structure of such a circuit is clearly adapted to the characteristics of the incoming/outgoing flow on the line $2_k$.

In particular, in the transmission direction towards the ATM network, the circuit 10 interconnects the application at the physical level, by converting for instance the data flow received into a structure made up of clock and data signals at TTL level; moreover, the byte synchronism is extracted and the quality of the connection is monitored. In the opposite direction the circuit 10 performs the complementary operations: synchronism insertion and joint coding of data and clock signals.

In the transmission direction from the line $2_k$ towards the ATM network the following elements can be recognised:

a segmentation circuit 11 which, after a series/parallel conversion, subdivides the incoming data flow received from the line $2_k$ (through the circuit 10) into a sequence of packets constituting the payload of the ATM cell; this operation takes place according to a general operating principle governed by a FIFO (First In—First Out) logic;

an assembling circuit 12 which assembles the packets received from the segmentation circuit 11 with the header data received from the control unit 6 in order to construct the ATM cells, including the related control signals destined to be used by the unit 6 to identify each cell, and an additional interface circuit 13 which sends the ATM cells constructed by the circuit 12 over the bus 4 for their transfer towards the unit 5.

In complementary fashion, in the direction towards the line $2_k$, the following elements are present:

an interface circuit 14 which receives from the bus 4 the ATM cells coming from the unit 5, a circuit 15 for frame integrity verification, which analyses the flow of cells received from the interface 14 and verifies that no cells have been lost by the ATM network (and, if need be, integrates the flow of cells with "stuffing" cells to preserve frame integrity), and an extraction circuit 16 which, substantially, definitively breaks up the ATM cells and reconstructs the original structure of the data flow destined to be sent towards the line $2_k$ through the interface 10.

In particular, in the set of circuits 15 and 16 the flow of cells is stored and, after the AAL1 protocol byte has been subjected to verification to assess frame integrity, the payloads of the cells are assembled, by a module forming the application flow, into a continuous data structure, by inserting stuffing payloads where appropriate. The assembled flow thus created, subjected in effect to a parallel/series conversion, is adapted in time (i.e. synchronized) with the time base of the interface towards the application. The frame integrity check occurs by verifying, on the basis of an AAL1 protocol which in transmission provides for numbering the transmitted cells, that the cells are progressively numbered. If the absence of a cell is detected, then a communication is forwarded to the module assembling the application flow, which module restores the frame integrity by inserting stuffing data. In particular the circuit 16 incorporates a buffer circuit and generates an indication about the degree of filling of that buffer. This indication is used to control an oscillator (VCXO) which provides the timing to the interface (for instance G703) and correlates this timing to that of the source application by increasing (or decreasing) the frequency of the oscillator and thus the speed at which the buffer is emptied, depending on whether the buffer itself tends to become full (or empty).

Figure 4:
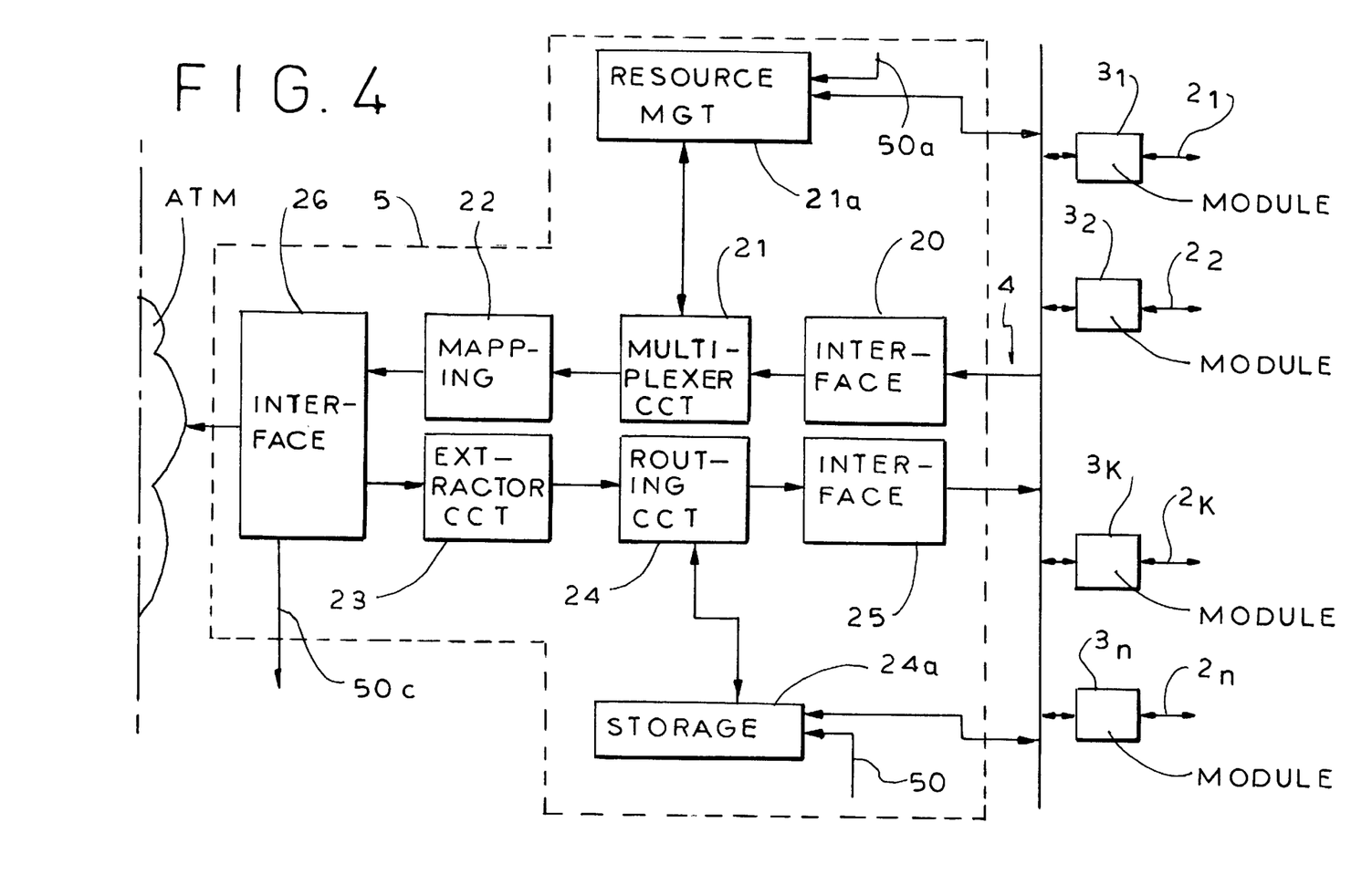

The unit 5, whose structure is shown in detail in FIG. 4, comprises instead, in the direction from the bus structure to the ATM network:

an interface circuit 20 destined essentially to allow interworking of the unit 5 with the various modules $3_k$, through the bus 4, a multiplexing circuit 21 which multiplexes the different data flows coming from the different modules $2_k$, connected to the bus 4, into a single flow of ATM cells; multiplexing circuit 21 is associated with an element 21a whose function is to manage the transmission resources, under the control of unit 6 (line 50a being part of the connection 50, together with lines 50b, 50c which shall be seen farther on).

a mapping circuit 22 which maps the aforesaid cells in the PDH (Plesiochronous Digital Hierarchy) frame used for transport by the ATM network: in practice, the circuit 22 inserts cells coming from the multiplexing circuit 21 into the frame, by inserting empty cells (so-called "idle" cells) into the bandwidth portion not used for transport and by managing the fields of the frame destined to service information (overhead).

In the direction of transmission from the ATM network towards the modules $3_1 \ldots 3_n$, instead, the following units are present:

an extracting circuit 23 which extracts the cells from the PDH frame of the ATM network, in particular by identifying and extracting the cells pertaining to the activated connections, a routing circuit 24 (in practice a demultiplexer) which routes each cell received towards a respective module $3_k$, by comparing the cell header with a routing table of the connections stored in a circuit 24a acting under the control of the control unit 6 (line 50b), and an interface 25 whose function is essentially analogous to that of the interface circuit 20, except for the different direction of operation.

The circuit 22, in one direction, and the circuit 23, in the opposite direction, are connected to an interface circuit 26 comprising essentially a PDH interface towards the ATM network: in practice, it is a physical interface which is also able to provide block 6 with alarms (line 50c) related to the quality of the connection set up through the device 1.

Given the preceding description of the functions performed by the individual blocks, the construction of the relevant circuits requires the application of simple design techniques, in the reach of people with normal skill in the art.

Bus structure 4 operates so that, at the receiving side (with reference to modules $3_k$), it interconnects all the transmission sections (circuit 14) of the modules $3_k$ to the reception section (circuit 25) of the central unit 5. This takes place by implementing a structure which can essentially be seen as a tripartite structure.

A first section of the bus 4 transports data from the unit 5 towards the modules $3_k$: in practice, the cells extracted in the unit 5 from the frame received from the ATM network are made available on the bus 4.

A second section of the bus enables reception in a certain module $3_k$, by making available on the bus 4 the identifier of the module $3_k$ (provided by the table of connections contained in 24a) towards which the content of the data section is to be addressed.

A third section of the bus contains information about the synchronization and the timing of the different components making up the reception section, i.e.:

the byte clock of the data flow, a template identifying the payload of the ATM cell (typically from byte 6 to byte 53), and the cell synchronism in correspondence with the first byte of the payload.

In dual manner, also for transmission from the modules $3_k$ towards the central unit 5 bus 4 is organised according to a tripartite structure.

A first section of the bus conveys the cells assembled (circuit 12 in FIG. 3) in the various modules $3_k$.

A second section of the bus assigns a request line to each module $3_k$; the transmission of one or more requests on this section of the bus entails the enabling, accomplished by the centralized unit 5 by assigning the corresponding address on the respective wires of the bus, of the module having to access the data section of the bus in order to insert thereon the related outgoing cells.

A third section of the bus conveys, also during transmission, all cell synchronisation and system timing information. In this case as well, the signals present are those corresponding to:

the byte clock of the data flow;

the cell synchronism, usually present half a period before the start of the cell, and an enabling window for the search for transmission requests, activated for example in correspondence with the fiftieth byte of the cell and deactivated as soon as an active request is detected.

In particular, the access phases of the modules $3_k$ to the bus 4 are coordinated so as to avoid conflict situations and to guarantee the same opportunity for accessing bus 4 to all modules $3_k$. This applies in particular when, according to the currently preferred embodiment of the invention, the centralised unit 5 is dimensioned in such a way as to be able to multiplex cells corresponding to a data flow (at least) equal to the sum of the flows of the lines $2_k$, into a single flow of ATM cells.

It will be appreciated that this characteristic affords two important functional advantages:

all modules $3_k$ can access, in a virtually simultaneous manner, the ATM network, in practice as separate connections and without limitations imposed on the incoming and/or outgoing flows, and an automatic adaptation of the requests imposed to the ATM network according to instantaneous transport needs is obtained: thus the allocation of a fixed transport capacity, which would be exposed to the risk of a greatly incomplete usage, is avoided.

Figure 5:
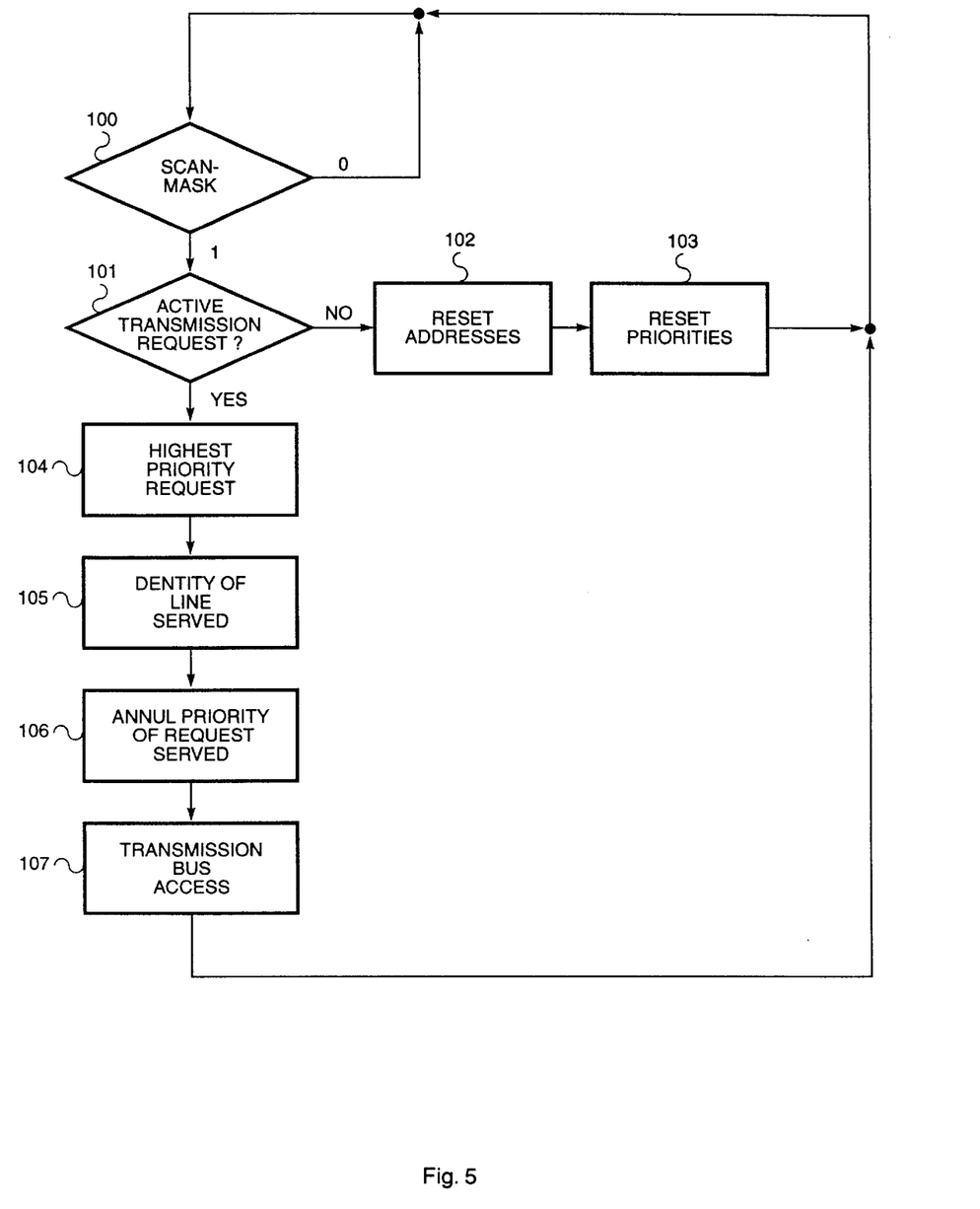
FIG. 5 is a flow chart, showing the criteria for managing transmission requests in a device according to the invention.

The flow chart in FIG. 5 shows, by way of example, the possible criteria for managing the aforesaid mechanism for access to bus 4 accomplished by the element 21a under the control of the unit 6.

At step 100 a check is performed on the occupation state of the transmission bus by one of the modules $3_1 \ldots 3_k \ldots 3_n$. When the bus is found to be busy, the analysis process of the transmission requests is disabled (signal Scan_Mask=0), otherwise it is activated (signal Scan_Mask=1).

As soon as this process is activated, the system proceeds towards step 101 where, by analyzing the logic sum (OR) of all transmission requests, the presence of at least one active request is detected. Two cases can occur.

First case: one or more active requests.

In this case the system proceeds towards step 104 in which the request with the highest current priority is identified (in particular, the request coming from the module whose last access to the bus 4 is the farthest in time).

At step 105, the coding corresponding to the request line served (the one with the highest priority) is sent on the bus enabling the transmission sections of the modules $3_1 \ldots 3_k \ldots 3_n$.

At step 106, the priority of the request just served is cancelled; this can be obtained, in a wholly conventional manner, by queuing the identity of the module just served to a list of modules which have requested access, so that the first module of the list is the one whose request has the highest priority.

At step 107, the module just enabled accesses the transmission bus and sends thereon a cell; the process of analysis of the subsequent requests is deactivated for the duration of this phase (Scan_Mask=0) and enabled again at its end.

Second case: no active request.

This situation can be reached as a result of two phenomena:

the first one is due to the absence of transmission requests by all modules $3_1 \ldots 3_k \ldots 3_n$ of the apparatus;

the second one due to the fact that during the servicing processes of the active requests, all the priorities of the requests were cancelled.

In both cases it is appropriate to reset the device that processes such requests. This operation is performed at steps 102 and 103: at step 102, any enabling address present on the enabling bus is reset and at step 103 the starting priority of all requests is restored.

The operation of a system like the one shown in FIG. 1 is accomplished, at the signalling level, under the co-ordination of the units 6 of the various devices 1 connected (or of the unit serving as system master) and of the normal signalling functions of the ATM network (of a type known in the art).

The protocols that allow the co-ordination of the operations between each device 1 comprised in a system like the one shown in FIG. 1 and the ATM network can be subdivided into two families, according to the characteristics and the functionalities accomplished.

A first family, which can be defined as meta-signalling protocols, comprises the protocols related to the phase in which the network assigns a signalling channel dedicated to the dialogue between a specific device 1 and the ATM network.

The second family, which can be defined as signalling protocols, comprises the protocols related to the management of the connections among the various terminals present in the network and to the control of the functionalities of the apparatuses.

Meta-signalling Protocol

In order the device 1 is able to communicate with the ATM network, it is necessary that the ATM management centre assign it a dedicated signalling virtual channel. The identification of this channel takes place by introducing into the header of the cells forming the channel itself a particular identifier called SVCI (Signalling Virtual Channel Identifier) in accordance with the ITU I.361 specifications.

This assignment occurs on demand by the device 1 which, upon becoming connected in the network, transmits a request on a virtual channel (denominated MSVC: Meta-signalling Virtual Channel) dedicated to this purpose and shared by all terminals connected in the network.

The purpose of the meta-signalling protocols is to collect all requests by the applications desiring to dialogue with the network and to assign each of them an appropriate Signalling Virtual Channel SVC. The same protocols must be able to release these assignments once an application is disconnected from the network.

All subsequent dialogue operations between the device and the ATM network are accomplished by using the signalling channel SVC.

Figure 6A:
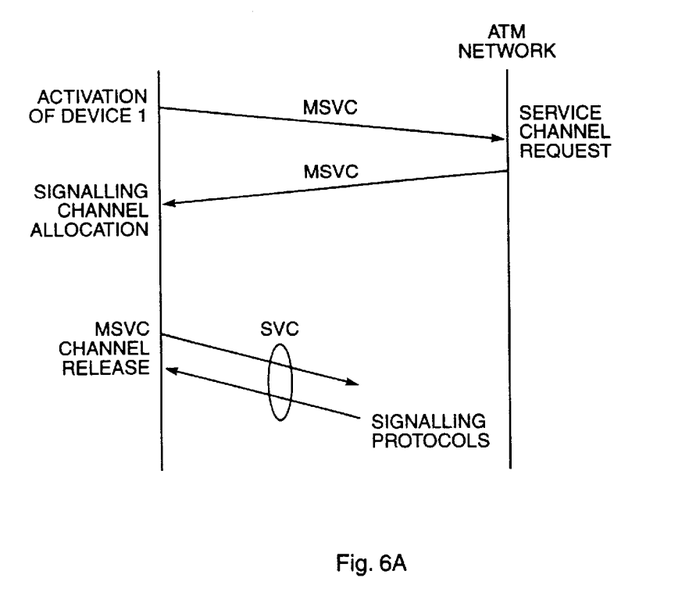

This procedure is shown schematically by the diagram in FIG. 6a wherein both the operation performed and the virtual communication channel used are indicated.

Signalling Protocol

After assignment by the ATM network of the signalling virtual channel, the device 1 is able to perform all operations related to management of the connections, listed below:

set up and release of a connection: the device must be able to manage independently a number of connections equal to the number of application inputs it is fitted with; in particular the device must be able to add or remove connections without affecting the operations of the active ones;

dialogue with the network: it defines the characteristics of the service assigned to each application interface requiring a new connection;

monitoring and control over any malfunctions in the interface apparatuses to and from the network.

Figure 6B:
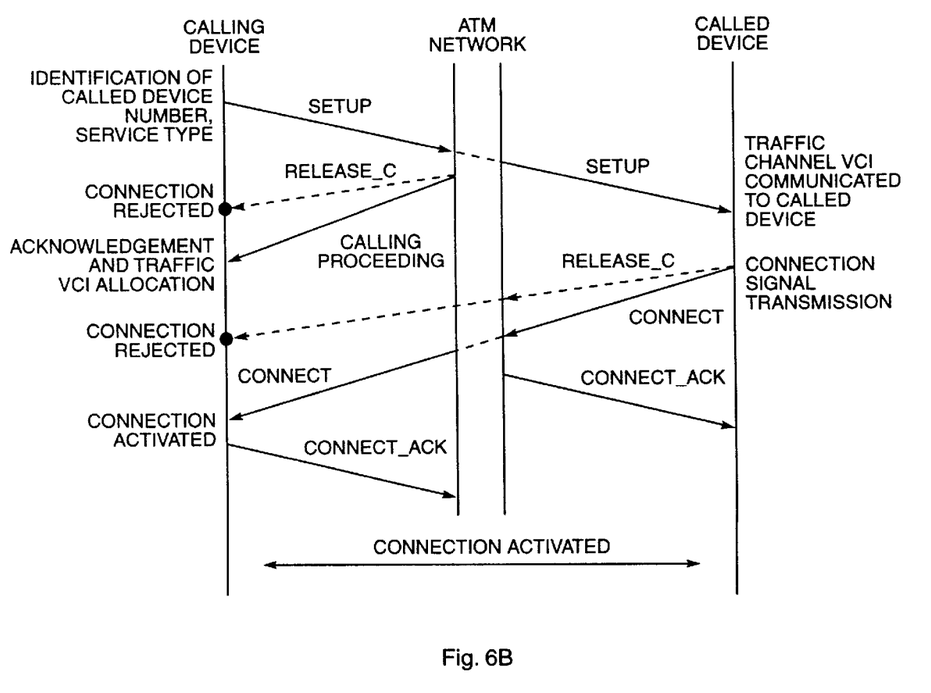

FIG. 6b shows the procedure for setting up a connection between two applications, each connected to a respective device 1. Routing in the device 1 of the data flows from the ATM network interface towards the respective application outputs and vice versa is coordinated by the device 1/device 1 protocol to be described farther on.

The Figure shows that the procedure can be subdivided into four phases:

phase 1: by using the protocol between operator (or management unit) and device 1, the number (identifier) of the device 1 called and the type of service the network is to offer to allow interworking between the two devices are transmitted. The request is sent to the ATM network by means of a signalling in compliance with specifications Q.2931 through the SVC channel (SETUP message);

phase 2: he network assesses the possibility of performing the connection by analysing the following parameters:

a) correctness and compatibility of the information contained in the SETUP message b) bandwidth availability to satisfy the service requested c) availability of the paths to obtain a connection between the two devices 1.

phase 3: on the basis of the results obtained by the analysis performed during phase 2, the ATM network can take two distinct actions:

a) the conditions listed for phase 2 are not met: the connection cannot be set up and the calling device is sent a refusal message (RELEASE_C)

b) all conditions of phase 1 are met: the network sends a SETUP message to the called device, in which message the type of service and the identifier of the virtual channel from which the information is to be taken are indicated; moreover, a procedure start message (calling proceeding) is transmitted to the calling device that contains the identifier of the virtual channel on which the data flow is to be sent.

phase 4: the called device, once received the set-up message, can take two distinct actions:

a) if the set-up parameters are incompatible with the performance the device can provide, the latter sends a call refusal message to the network (RELEASE_C) which message is then sent by the network to the calling device b) if the message is accepted, the device sends the network a connection start message (CONNECT) which is subsequently transmitted by the network to the calling device. Both the network and the device reply to this message with an acknowledgement message (CONNECT_ACK). From this moment the connection is activated and therefore the transport of information flows between the two devices starts.

Figure 6C:
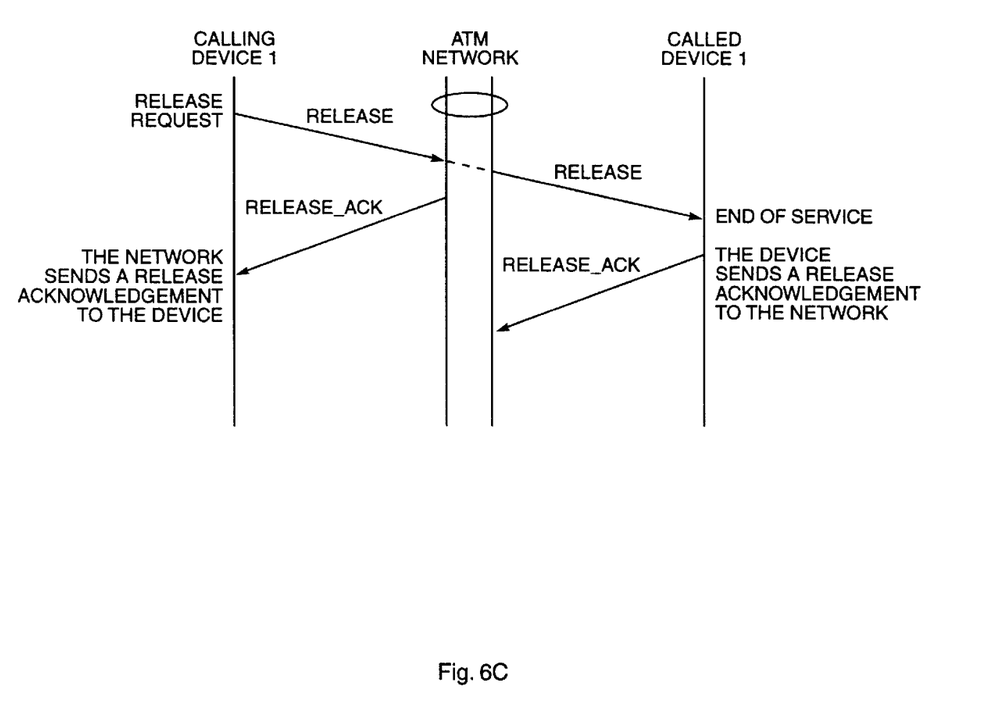

An additional signalling procedure concerns the connection release, shown in FIG. 6c. The calling device sends the release request to the network and receives therefrom a release acknowledgement. Similarly the network sends the release request to the called device and receives therefrom a release acknowledgement. The Figure is self-explanatory and no further comment is necessary.

Of course, without changing the principle of the invention, the embodiment details may be varied widely with respect to what has been described and illustrated, without thereby departing from the scope of the present invention.

What is claimed is:

1. A device for interfacing an ATM network and a plurality of connection oriented lines comprising:

a plurality of modules allowing direct access to an ATM network by at least one respective connection oriented line and arranged to accomplish, starting from a flow of digital data received on said connection oriented line, a segmentation of said data into ATM cells and, conversely, to reconstruct an outgoing data flow on at least one respective line starting from ATM cells; and a centralized unit connected to the modules tasked with manipulating ATM flows and managing access requests by said connection oriented lines and arranged to multiplex ATM cells received from said modules into a flow of cells which can be managed by said ATM network and, respectively, of demultiplexing a flow of cells managed by said ATM network into ATM cells each routed towards a respective module, said centralized unit dynamically assigning the access band available on the ATM network according to the access requests by said modules by handling individual requests as separate connections, the modules being connected to said centralized unit through a bus structure, said modules comprising, in a path from said centralized unit to said connection lines, a circuit for verifying the integrity of a frame into which ATM cell flows are organized and a circuit for the selective extraction from said frame of the data flow destined to the respective connection line, said centralized unit further comprising a path from said modules to said ATM network, a circuit for multiplexing the ATM cells received from respective modules, associated with a circuit for managing the transmission resources, and a circuit for mapping said multiplexed cells into a frame of ATM cells.

2. The device defined in claim 1 wherein said centralized unit comprises, in the path from said ATM network to said modules, a circuit for cell extraction from an ATM frame and a circuit for the selective routing of the extracted cells to respective modules.

3. The device defined in claim 1 wherein said modules comprise, on a side connected to said connection lines a physical interface with said connection lines.

4. A device for interfacing an ATM network and a plurality of connection oriented lines comprising:

a plurality of modules allowing direct access to an ATM network by at least one respective connection oriented line and arranged to accomplish, starting from a flow of digital data received on said connection oriented line, a segmentation of said data into ATM cells and, conversely, to reconstruct an outgoing data flow on at least one respective line starting from ATM cells; and a centralized unit connected to the modules tasked with manipulating ATM flows and managing access requests by said connection oriented lines and arranged to multiplex ATM cells received from said modules into a flow of cells which can be managed by said ATM network and, respectively, of demultiplexing a flow of cells managed by said ATM network into ATM cells each routed towards a respective module, said centralized unit dynamically assigning the access band available on the ATM network according to the access requests by said modules by handling individual requests as separate connections, the modules being connected to said centralized unit through a bus structure, said modules comprising, in a path from said centralized unit to said connection lines a circuit for verifying the integrity of a frame into which ATM cell flows are organized and a circuit for the selective extraction from said frame of the data flow destined to the respective connection line, a control unit being provided for a control of operation of said centralized unit and of said modules.

5. The device defined in claim 4 wherein said control unit is configurable in at least a master configuration, where the respective device is capable of controlling at least another analogous device connected to said ATM network, and at least a slave configuration, where the respective device is capable of being controlled by at least another analogous device connected to said ATM network.

6. The device defined in claim 4 wherein at least some of said modules are selectively removable for replacement with other modules.

7. The device defined in claim 4, further comprising means for generating a request for allocating a first signalling virtual channel (MSCV) on the ATM network, which channel is shared with at least another homologous device connected to the ATM network itself, for assignment, to the device generating said request, of a respective second signalling virtual channel (SVC) on the ATM network.

* * * * *